United States Patent [19]

Ross

[11] Patent Number: 4,917,469

[45] Date of Patent: Apr. 17, 1990

[54] ADDRESSING LIQUID CRYSTAL CELLS

[75] Inventor: Peter W. Ross, Stansted, Great Britain

[73] Assignee: STC PLC, London, England

[21] Appl. No.: 214,532

[22] Filed: Jul. 1, 1988

[30] Foreign Application Priority Data

Jul. 18, 1987 [GB] United Kingdom ............... 8716992

[51] Int. Cl.⁴ .......................... G02F 1/13; G09G 3/02
[52] U.S. Cl. ................ 350/332; 350/331 T; 350/350 S; 340/713; 340/805
[58] Field of Search ............... 350/350 S, 332, 333, 350/331 T; 340/784, 805, 765, 713

[56] References Cited

U.S. PATENT DOCUMENTS

| | | | |
|---|---|---|---|
| 4,045,791 | 8/1972 | Fukai et al. | 340/713 X |
| 4,100,540 | 7/1978 | Fujita et al. | 340/324 M |
| 4,242,679 | 12/1980 | Morozumi et al. | 340/765 |
| 4,586,039 | 4/1986 | Nonomura et al. | 340/784 |
| 4,625,204 | 11/1986 | Clerc | 340/784 |
| 4,705,345 | 11/1987 | Ayliffe | 350/350 S |

FOREIGN PATENT DOCUMENTS

| | | |
|---|---|---|
| 2316863 | 10/1973 | Fed. Rep. of Germany . |
| 2546324 | 11/1984 | France . |
| 2581209 | 10/1986 | France . |
| 0153029 | 8/1985 | Japan ............... 350/331 T |
| 0249025 | 11/1986 | Japan ............... 350/331 T |
| 0246014 | 10/1987 | Japan ............... 350/331 T |
| 1432382 | 4/1976 | United Kingdom . |
| 2173336 | 10/1986 | United Kingdom ............... 340/784 |
| 2173337 | 10/1986 | United Kingdom ............... 340/784 |
| 2173629 | 10/1986 | United Kingdom ............... 340/784 |
| 2173629A | 10/1986 | United Kingdom . |

Primary Examiner—Andrew J. James
Assistant Examiner—Huy K. Mai
Attorney, Agent, or Firm—Lee, Mann, Smith, McWilliams & Sweeney

[57] ABSTRACT

The working temperature range of a 2 μm thick negative dielectric anisotropy smectic C phase filled ferroelectric liquid crystal cell that is addressed on a matrix basis with balanced bipolar data pulses and unipolar strobe pulses is extended by the inclusion of a temperature sensor to use the temperature of the cell to control the magnitudes of the data and strobe pulse waveforms and to provide, at least at high temperatures, a stabilization waveform with a frequency twice the fundamental frequency of the data pulse waveform.

21 Claims, 4 Drawing Sheets

ADDRESSING LIQUID CRYSTAL CELLS

BACKGROUND OF THE INVENTION

This invention relates to the addressing on a co-ordinate basis of ferroelectric liquid crystal cells exhibiting negative dielectric anisotropy.

Published United Kingdom patent specification No. 2173629A describes one such addressing method which involves applying bipolar data pulses in parallel to one set of electrodes while unipolar strobe pulses are applied serially to the other set so as to write the data into the cell on a line-by-line basis. The unipolar nature of the strobe pulses dictates that a single strobe pulse can be used for switching pixels in one direction only. One way of overcoming the difficulty that this presents is to use the strobe and data pulses to set selected pixels of a group into one state (one data significance) having first used a blanking pulse of opposite polarity to the strobe pulse to set all the pixels of that group into the other state (the other data significance). The group of pixels may for instance comprise a single line of pixels, a limited set of lines, or the set of all lines of the display. An alternative way of overcoming this difficulty, the way employed in GB No. 2 173 629A, is to arrange for the polarity of the strobe pulses to be regularly alternated. Under these circumstances selected pixels of a line can be set into the one state with the aid of a strobe pulse while those pixels of that line required to be set into the other state have to wait to be set into their required state until the advent of a strobe pulse of the opposite polarity.

For any particular chemical composition of the liquid crystal layer it is found that there is, at any given temperature of operation with the working range, a particular voltage threshold for achieving switching with pulses of a particular duration. The magnitude of the strobe pulses is $+V_S$ or $-V_S$, and that the data pulses make excursions between $+V_D$ and $-V_D$, the switching threshold $V_{TH}$ is given by $V_{TH} = |V_S + V_D|$. The value of $V_D$ affects what happens to the unselected pixels, and so there is an optimum partioning of $V_{TH}$ between $V_S$ and $V_D$ in order to achieve maximum contrast. The optimum valve of the ratio $V_S : V_D$ is generally found to be temperature dependent.

One way of avoiding problems associated with temperature dependent switching effects is to operate the device with a thermostatted liquid crystal layer, but this option may be inappropriate, or difficult or impossible to implement in certain situations. An alternative option is to allow the temperature to vary, at least within a restricted range, and to arange to compensate such changes as do occur by making appropriate changes to the durations of the strobe and data pulse waveforms while maintaining their amplitudes unchanged. Particular circumstances can make this approach inconvenient or otherwise difficult to implement.

SUMMARY OF THE INVENTION

A further alternative is to compensate for temperature changes by adjusting the strobe and data pulse waveform amplitudes rather than their durations. This is the option with which the present invention is particularly concerned. However, when using this approach with ferroelectric liquid crystal layers exhibiting negative dielectric anisotropy, it has been found that the range of satisfactory operating temperature has a relatively sharp cut-off at the upper end, above which there is a marked deterioriation in contrast. The present invention is particularly concerned with extending the useful range of operating temperature.

According to the present invention there is provided a method of coordinate addressing a liquid crystal cell, having first and second sets of electrodes which define the pixels of the cell, which method involves applying unipolar strobe pulses to said first set of electrodes and applying bipolar pulses to said second set of electrodes, wherein, at least above a given temperature, an alternating voltage stabilization waveform is applied to the pixels which stabilization waveform is at a higher frequency than the fundamental frequency that is defined by the waveform of one of said bipolar pulses.

According to a preferred aspect of the present invention there is provided a method of addressing a matrix-array type liquid crystal cell with a ferroelectric liquid crystal layer exhibiting negative dielectric anisotropy whose pixels are defined by the areas of overlap between the members of a first set of electrodes on one side of the liquid crystal layer and the members of a second set on the other side of the layer, in which method the pixels are selectively addressed on a line-by-line basis by the application of unipolar strobing pulses serially to the members of the first set of electrodes while charge balanced bipolar data pulses are applied in parallel to the members of the second set, the positive going parts of the bipolar data pulses being synchronized with a strobe pulse for one data significance and the negative going parts being synchronized with the strobe pulse for the other data significance, wherein the amplitudes of the waveforms of the strobing and data pulses are changed in response to changes in the temperature of the liquid crystal layer, and wherein at least above a given temperature an alternating voltage stabilization waveform is applied to the pixels between consecutive strobings, which stabilization waveform is at a frequency which is an even multiple of the fundamental frequency that is defined by the bipolar data pulse waveform.

The invention also resides in a liquid crystal device including a liquid crystal cell with a ferroelectric liquid crystal layer exhibiting negative dielectric anisotropy whose pixels are defined by areas of overlap between the members of a first set of electrodes on one side of the liquid crystal layer and the members of a second set on the other side of the layer, which device includes strobing means and data entry drive means adapted to address the pixels selectively on a line-by-line basis by the application of unipolar strobing pulses serially to the members of the first set of electrodes while charge balanced bipolar data pulses are applied in parallel to the members of the second set, the positive going parts of the bipolar pulses being synchronized with the strobe pulse for one data significance and the negative going parts being synchronized with the strobe pulse for the other data significance, which device also includes a waveform generator, a temperature sensor, and a waveform voltage amplitude controller, wherein the temperature sensor is adapted to sense the temperature of the cell, and the waveform controller is adapted, in response to an input from the temperature sensor, to control the voltage amplitudes of the strobe and data pulse waveforms, and of a stabilization waveform applied to the pixels between consecutive strobings, the fundamental frequency of which stabilization waveform is an even multiple of the fundamental frequency that is defined by the bipolar data pulse waveform.

The use of the alternating voltage stabilization waveform is only required above a certain critical threshold temperature. Beneath this temperature it is surmised that the magnitude of the data pulse waveform is enough to provide the requisite stabilization. It is therefore not necessary to continue with the stabilization waveform below the critical threshold temperature, though it may be maintained, making any necessary adjustment to the magnitudes of the strobe and data pulse waveforms.

In principle the stabilization waveform can be applied to either set of electrodes, or even be shared between them, but generally it is preferred to apply it to the set of electrodes to which the strobe pulse waveform is applied. The stabilization waveform can be applied on a continuous basis, but since its intended effect is to stabilize (hold) the individual pixels in their pre-existing states, whereas the strobe pulse intended to enable selected pixels to be switched to their other states, it is generally preferred to remove the application of the stabilization waveform from any particular electrode while it is in receipt of any strobe pulse. There can also be advantage in removing the stabilization waveform, not only at the moment of the application of the strobe pulse, but also a short time before its application in order to allow the stabilization effect of the waveform to decay before the onset of the strobe pulse.

The appropriate magnitude of the stabilization waveform above the threshold temperature may itself be temperature dependent. Generally, it may be found convenient to use a frequency that is a low-order even multiple of the fundamental frequency of the data pulse waveform, typically twice. In these circumstances the range of satisfactory operating temperature of the device may be curtailed at its upper end by the optical response of the liquid crystal becoming fast enough to enable it to track, to a significant extent, the alternating field of the stabilization waveform. Under these circumstances it may be possible to extend the useful operating temperature range for switching the stabilization waveform to a higher frequency once this condition begins to become manifest, changing for instance from a frequency that is twice the fundamental frequency to one that is four times that frequency.

BRIEF DESCRIPTION OF THE DRAWINGS

There follows a description of the operation of a matrix array type smectic liquid crystal cell embodying the invention in a preferred form. The description refers to the accompanying drawings in which.

DETAILED DESCRIPTION OF PREFERRED EMBODIMENTS

Figure 1:
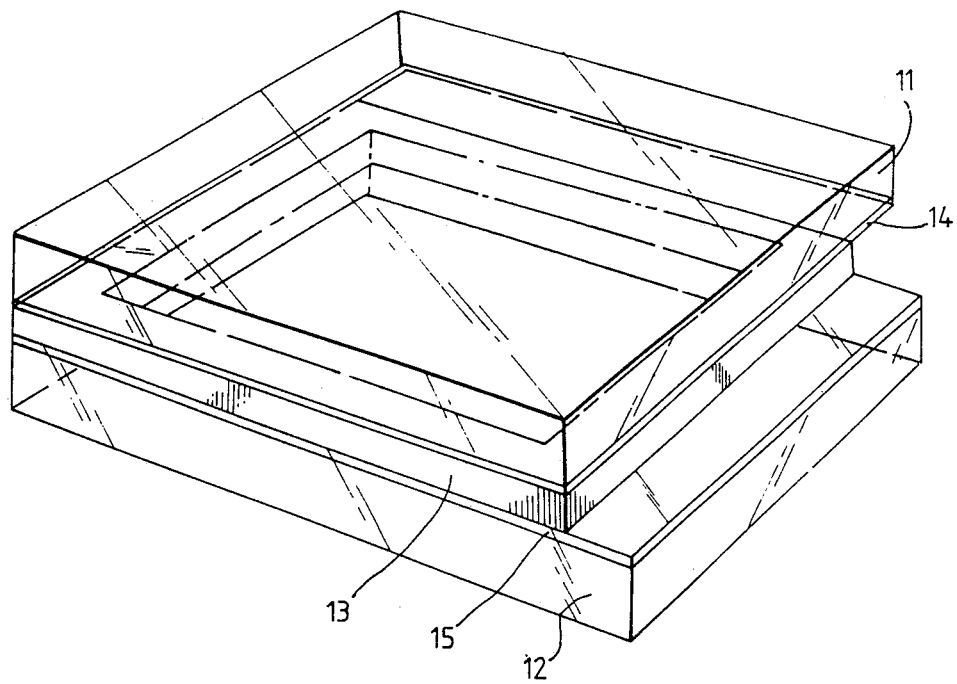
FIG. 1 depicts a schematic perspective view of a ferroelectric liquid crystal cell.

Referring now to FIG. 1, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and one or sometimes both of these electrode layers is covered within the display area defined by the perimeter seal with a polymer layer, such as nylon (not shown), provided for molecular alignment purposes. The nylon layer is rubbed in a single direction so that, when a liquid crystal is brought into contact with it, it will tend to promote planar alignment of the liquid crystal moleculars in the direction of the rubbing. If the cell has polymer layers on both its inward facing major surfaces, it is assembled with the rubbing directions aligned parallel with each other. Before the electrode layers 14 and 15 are covered with the polymer, each one is patterned to define a set of strip electrodes (not shown) that individually extend across the display area and on out to beyond the perimeter seal to provide contact areas to which terminal connection may be made. In the assembled cell the electrode strips of layer 14 extend transversely of those of layer 15 so as to define a pixel at each elemental area where an electrode strip of layer 15 is overlapped by a strip of layer 14. The thickness of the liquid crystal layer contained within the resulting envelope is determined by a light scattering of polymeric spheres of uniform diameter throughout the area of the cell. Conveniently the cell is filled by applying a vacuum to an apertue (not shown) through one of the glass sheets in one corner of the area enclosed by the perimeter seal so as to cause the liquid crystal medium to enter the cell by way of another aperture (not shown) located in the diagonally opposite corner. (Subsequent to the filling operation the two apertures are sealed.) The filling operation is carried out with the filling material heated onto its nematic or isotropic phase so as to reduce its viscosity to a suitably low value. It will be noted that the basic construction of the cell is similar to that of for instance a conventional twisted nematic, except of course for the parallel alignment of the rubbing directions.

Typically the thickness of the perimeter seal 13, and hence of the liquid crystal layer, is between 1.5 and 3 $\mu$m, but thinner or thicker layer thicknesses may be required to suit particular applications. A preferred thickness is 2$\mu$m. A suitable material for the filling is the smectic C eutectic marketed by BDH of Poole in Dorset under the designation of SCE 3. This material, which exhibits negative dielectric anistropy at least over the frequency range from 1kHz to 40kHz, passes through the smectic A phase on cooling into the smectic C phase from the isotropic phase. In the case of a 2$\mu$m thick liquid crystal layer confined between the rubbed surfaces the entry of the material into the smectic A phase causes the smectic layers to be formed with bookshelf alignment (layers extending in planes to which the rubbing direction is normal), and this alignment of the smectic layers is found to be preserved when the material makes the transition into the smectic C phase.

Figure 2:
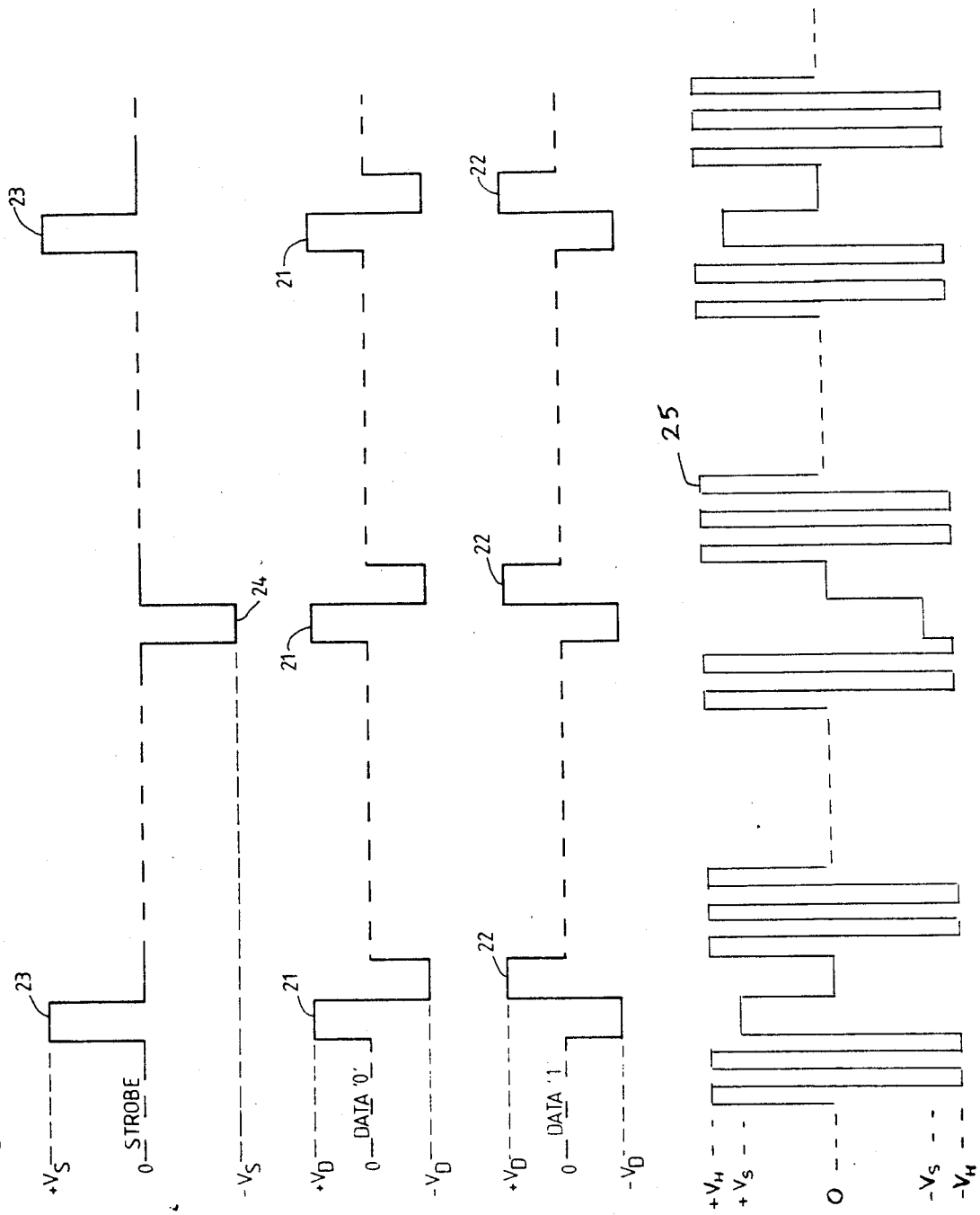
FIG. 2 depicts waveforms used to address the cell of FIG. 1.

Referring to FIG. 2, a preferred way of addressing the cell in a matrix basis employs charge balanced bipolar data pulses 21, 22 to co-act with positive-going and negative-going unipolar strobe pulses 23, 24. For line-by-line entry of data the strobe pulses are applied serially to the electrode strips of one electrode layer, while the data pulses are applied in parallel to those of the other layer. Data pulse 21, arbitrarily designated a data 1 0' pulse, comprises a voltage excursion to $+V_D$ for a duration $t_s$ followed immediately by a voltage excursion to $-V_D$ for a further duration $t_s$. Data pulse 22, arbitrarily designed a data '1' pulse, is similar to data pulse 21, but the order of the voltage excursions is reversed. Strobe pulse 23 comprises a voltage excursion to $+V_S$ for a duration $t_s$ while strobe pulse 24 comprises a voltage excursion to $-V_S$, also of duration $t_s$.

The pixels of the display are defined by the areas of overlap between the members of one set of electrode strips and those of the other. The unipolar strobe pulses are synchronized with the first halves of the data pulses. Therefore when a pixel is simultaneously addressed with a positive-going strobe pulse 23 and a data '0' pulse 21 it experiences a potential difference of $(V_S - V_D)$ for $t_s$, followed by a potential difference of $+V_D$. A pixel addressed with a strobe pulse 23 and a data '1' pulse 22 experiences a potential difference of $(V_S + V_D)$ for $t_s$, followed by a potential difference of $-V_D$. Correspondingly, a pixel addressed simultaneously with a negative-going strobe pulse 24 and a data '0' pulse 21, experiences a potential difference of $-(V_S + V_D)$ for $t_s$, followed by a potential difference of $+V_D$. Finally, a pixel addressed with a negative-going strobe pulse 24 and a data '1' pulse 22 experiences a potential difference of $-(V_S - V_D)$ for $t_s$, followed by a potential difference of $-V_D$.

The values of $V_S$ and $V_D$ are chosen so that a potential difference of $+(V_S + V_D)$ is sufficient to switch a pixel into its '1' state while a potential difference of $-(V_S + V_D)$ is sufficient to switch it into its '0' state. This switching must be effective with a switching stimulus of duration $t_s$ notwithstanding that it may be immediately preceded with an oppositely directed stimulus of magnitude $|V_D|$, and that it will be immediately followed by an oppositely directed stimulus of magnitude $|V_D|$. Additionally, the values of $V_S$ and $V_D$ must be chosen so that the other stimuli to which a pixel is liable to be exposed do not produce switching. For instance, while other lines are being addressed, a pixel is subjected to a stimulus of magnitude $|V_D|$ for a duration $2t_s$ whenever a bipolar data pulse of one data significance is immediately followed by a data pulse of the other data significance. This must not produce switching. Similarly switching must not be produced by a stimulus comprising $+V_D$ for $t_s$ immediately followed by $+(V_S - V_D)$ for $t_s$, itself immediately followed by $+V_D$ for a further $t_s$. This stimulus is produced by the data sequence '1'—'0' when a positive going strobe pulse 23 is coincident with the data '0'. Some relaxation of these conditions may be possible by providing intervals between consecutive data pulses, and/or by providing an interval between the two excursions of each bipolar data pulse, and/or by using an asymmetric form of charge balanced bipolar data pulse in which one excursion is m times the amplitude of the other, but only 1/mth its duration.

The positive-going strobe pulse 23 will co-operate with a data '1' pulse to produced a stimulus of magnitude $|V_S + V_D 51$, and thus is capable of being used to set selected pixels from a '0' state into a '1' state. It is not capable however of being used to set pixels from a '1' state into a '0' state because with neither significance of data pulse will it produce a stimulus of $-(V_S + V_D)$. Conversely a negative-going strobe pulse 24 can set '1' state pixels into the '0' state but not '0' state pixels into the '1' state. For this reason the addressing is generally operated with the polarity of the strobe pulse being reversed with each refreshing of the cell. It should be appreciated however that if for some reason it is desired to provide a slightly longer interval between polarity reversals (occupying a small number of refreshings), this can be accommodated, though it will be evident that this will entail the possibility of certain pixels being retained in their wrong states for correspondingly longer periods before being set into their correct states.

In the foregoing discussion it has been assumed that the strobe pulse is synchronized with the first voltage excursion of the bipolar data pulses. It should be appreciated that a satisfactory alternative involves synchronization of the strobe pulses with the second voltage excursions of the data pulses. In this case the data significances of the data pulses are interchanged.

According to one theory of the behaviour of smectic C filled ferroelectric cells with bookshelf alignment of their smectic layers, the molecules should be capable of being switched by single pulses between two stable states in one of which the average direction of the molecular axes lies in the plane of the liquid crystal layer at $+\psi$ to the smectic layer normal, and in the other of which the corresponding angle is $-\psi$. In practice however, it is found that the initial response to a single switching pulse relaxes substantially once that pulse has terminated. This relaxation is a great impediment to any form of multiplexing, but it is found that it can be avoided by the superimposing of an alternating potential at a frequency for which the liquid crystal exhibits negative dielectric anisotropy. Such an alternating potential is found to be capable of stabilization the switching of the cell substantially into its two fully switched states.

Figure 3:
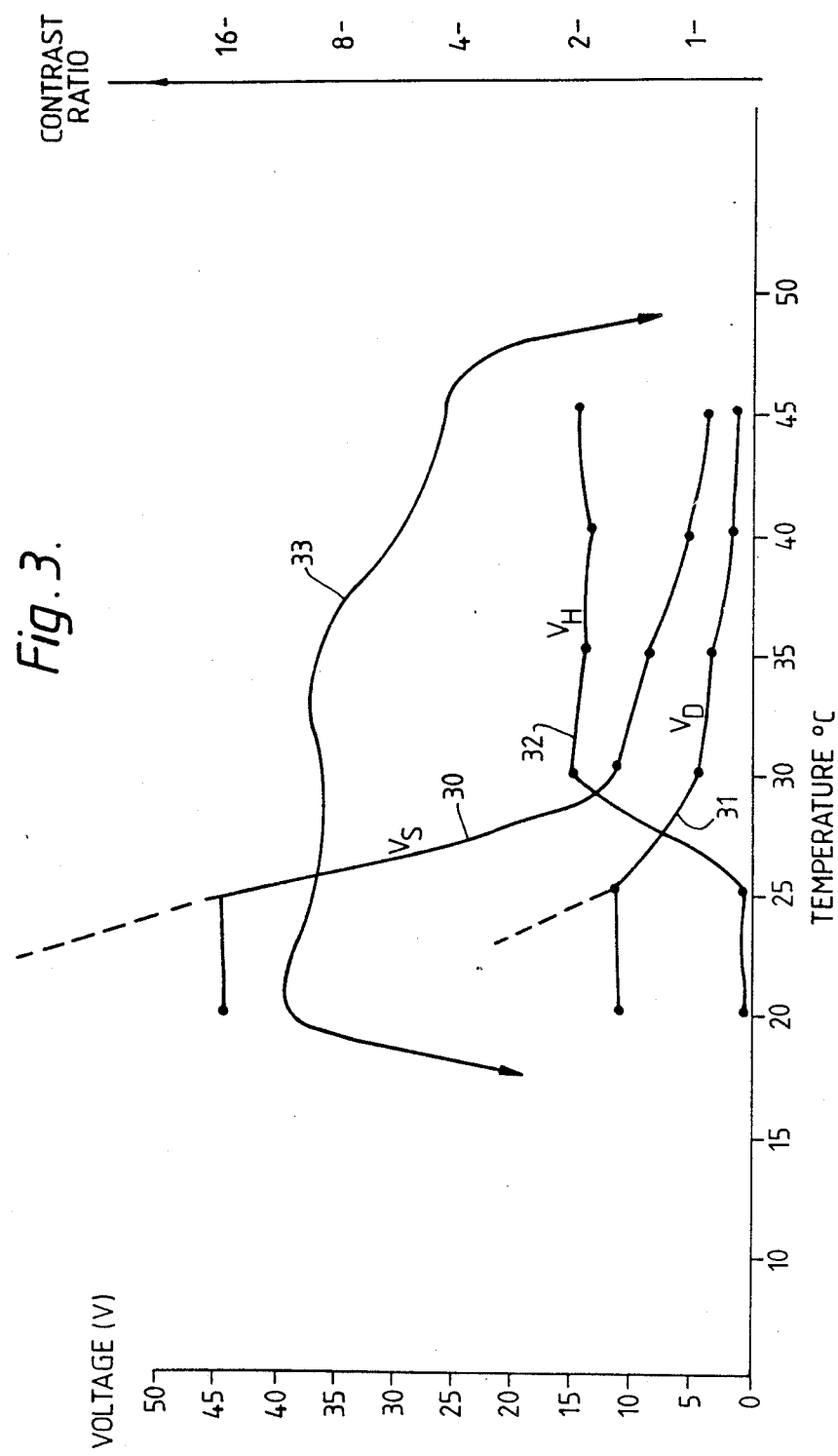
FIG. 3 depicts the relation voltage and temperature of the waveforms of FIG. 2.

When the addressing of the pixels of the cell of FIG. 1 is achieved using the addressing scheme of FIG. 2 the data stream is found, under appropriate conditions to provide a sufficient alternating voltage stimulus to the pixels between consecutive refreshings to prevent any appreciable relaxation effects without having to have recourse to any separate signal for stabilization purposes. However, with increasing temperature, the efficacy of the data stream in providing this stabilization is progressively reduced until the point is reached where separate stabilization at a frequency greater than the fundamental frequency of the data stream does become necessary. In the particular example of a cell filled with a $2\mu$m thick layer of SCE 3 driven with the addressing scheme of FIG. 2 at 1/6th video line rate (line address time 384 $\mu$s, $t_s=192\mu$s) the stabilization provided by the data stream begins to fail at a temperature of between 25° and 30° C., with the result that the upper end of this range the contrast of the display has fallen away so much as to render it effectively useless. FIG. 3 depicts the effect of superimposing an alternating voltage for stabilization (holding) purposes. In this instance the stabilization (holding) voltage $V_H$ is a square wave with a fundamental frequency of twice that of the data pulses. This is applied in parallel to the electrodes to which the strobe pulses are serially applied, being removed from each of those electrodes in turn while it is addressed with a strobe pulse. It was found convenient for this removal of the stabilization to be for the $192\mu$s of the strobe pulse itself, and, so as to make it equal to one line address period, for the $192\mu$s immediately following the strobe pulse. In FIG. 2 the strobe pulse waveform, complete with superimposed stabilization waveform is depicted at 25. In FIG. 3 the magnitude of the optimum strobe voltage $|V_S|$ expressed as a function of temperature is given by curve 30, that of the optimum data voltage $|V_D|$ is given by curve 31, while that of the applied stabilization (holding) voltage $V_H$ is given by curve 32. From these curves it is seen that the magnitude of stabilization voltage, $V_H$, rises from zero to a maximum over the temperature range 25° to 30° C., which is also a temperature range over which the values of optimum strobe and data voltages are rapidly changing. The portions of curves 30 and 31 below 25° C. shown in broken detail are extrapolations because, with the particular apparatus employed, it was not possible to provide a data pulse magnitude of greater than |45| volts. The solid portions of these curves between 20° and 25° C. relate to measurements made at 20° C. for which full switching was no longer possible with a single addressing, but for which full switching was obtained with a succession of addressings (all in the same sense). Also depicted in FIG. 3 is curve 33 which is a plot, expressed as a function of temperature, of the resulting contrast ratio of the display. Below about 20° C. the contrast ratio is falling off rapidly because of the slow response of the liquid crystal, whereas above 45° C. the contrast ratio is falling off rapidly because the response is fast enough for the cell to be beginning to be switched to an appreciable extent by the stabilization signal. This upper limit of the useful temperature range can be extended to higher temperatures by changing over to a higher frequency for the stabilization voltage.

Figure 4:
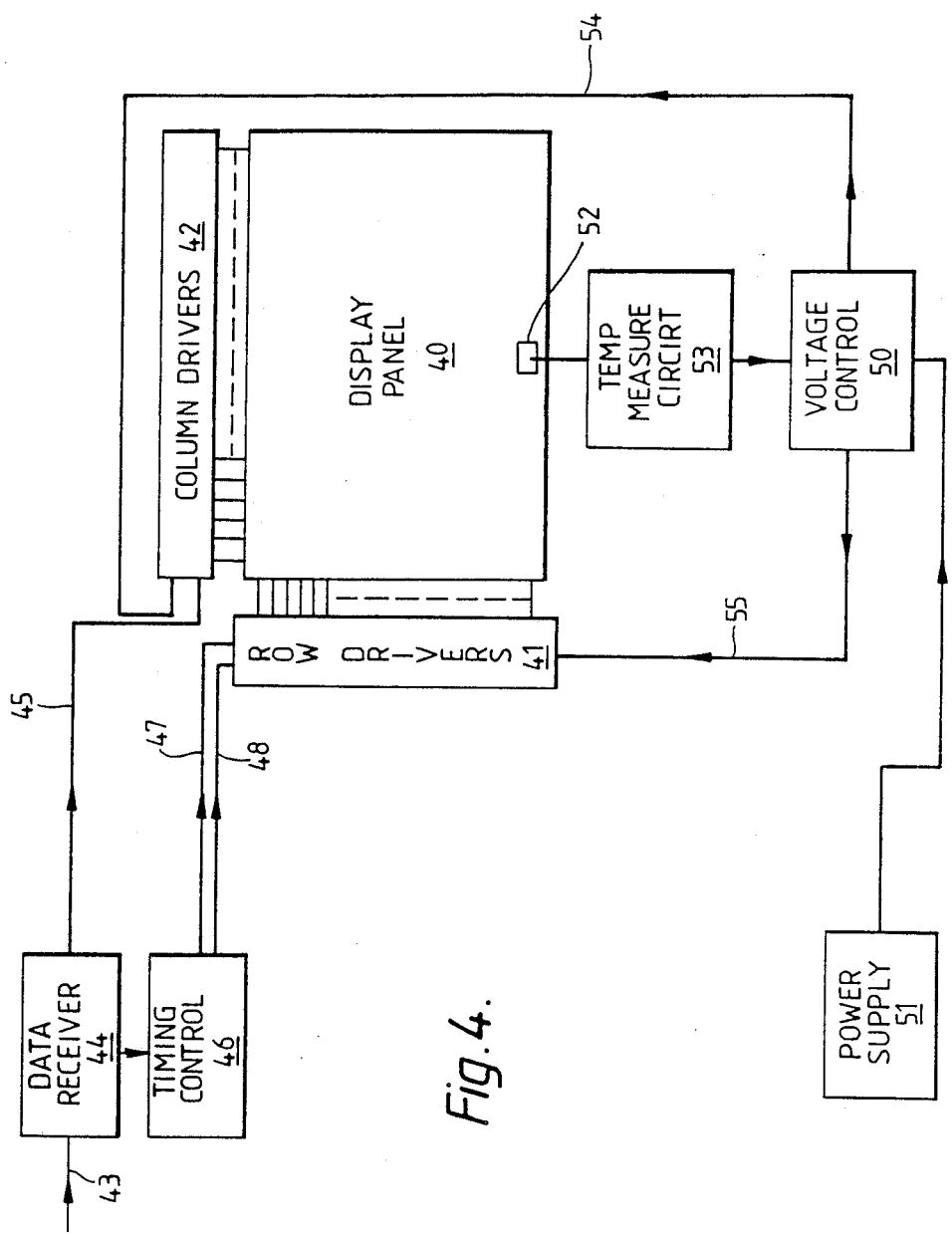
FIG. 4 depicts the basic elements of the drive circuitry employed to drive the cell of FIG. 1.

FIG. 4 depicts the basic elements of circuitry employed to drive the cell. The display cell itself is depicted at 40, and is addressed by means of sets of row and column drivers 41 and 42. For illustrative convenience these sets are depicted as extending only along the left hand side and top edges of the cell respectively, whereas in practice it may be preferred to have an interlaced arrangement with alternate members of the rows and columns being driven from sets of drivers disposed along opposite edges (i.e. drivers on all four edges). The incoming data is fed on a line 43 to a data receiver unit 44 which transmits data signals on line 45 to the set of column drivers 42. The data receiver unit also transmits a part of the received signal to a timing control unit 46 which employs this to produce a signal of appropriate frequency and phase for application to the set of row drivers 41 on line 47 for controlling the synchronization of the strobe. The timing control unit also uses the incoming signal to produce a phase locked signal at the stabilization signal frequency which is applied to the set of row drivers on line 48 for controlling the synchronization of the stabilization signals applied to the cell via the row drivers.

The signals applied to the drivers over lines 45, 47 and 48 control their operation but not the size of the voltages applied to the cell by these drivers. This is determined by a voltage control unit 50 receiving power from a stabilized power supply 51. A temperature sensor 52 attached to the cell 40 connected with a temperature measuring circuit 53 provides a temperature indicating input to the voltage control unit 50 which contains in ROM storage look-up tables of the required voltage/temperature relationships in respect of the data, strobe and stabilization voltages. The data pulse and voltages and voltage reference $\pm V_D$ and 0 are supplied to the column drivers on line 54, while the strobe pulse, stabilization voltage and voltage reference voltages $\pm V_S$, $\pm V_H$ and 0 are supplied to the row drivers on line 55.

I claim:

1. A method of operating a co-ordinate addressed liquid crystal cell having first and second sets of electrodes which define pixels of the cell that are selectively switchable between a first range of states and a second range of states, each said range extending from a fully switched state to a relaxed state, wherein said selective switching is effected by addressing the pixels on a line-by-line basis by applying unipolar strobe pulses serially to members of said first set of electrodes while charge balanced bipolar data pulses are applied in parallel to members of the second set of electrodes, which method of operating includes sensing the temperature of the liquid crystal cell to derive a signal representative of its temperature, employing the sensed temperature signal to control the amplitudes of the strobe and data pulses, and additionally employing the sensed temperature signal to apply, only when the sensed temperature exceeds a predetermined value, to each of the pixels between each of its consecutive addressings with strobe and data pulses, a stabilization voltage that is an alternating voltage whose frequency of alternation is higher than the fundamental frequency that is defined by the waveform of a single one of said bipolar data pulses.

2. A method as claimed in claim 1, wherein the frequency of alternation of said stabilization voltage is an even multiple of said fundamental frequency.

3. A method as claimed in claim 1, wherein said charge-balanced bipolar data pulses are square-wave bipolar pulses.

4. A method as claimed in claim 1, wherein said stabilization voltage is a square-wave voltage.

5. A method as claimed in claim 1, wherein in respect of each member of said first set of electrodes each unipolar strobe pulse applied to that member has a polarity that is the opposite of the polarity of the immediately preceding unipolar strobe pulse applied to that member.

6. A method as claimed in claim 1, wherein said stabilization voltage is applied to each member of said first set of electrodes only between consecutive addressings of that member with strobe pulses.

7. A method as claimed in claim 6, wherein the frequency of alternation of said stabilization voltage is an even multiple of said fundamental frequency.

8. A method as claimed in claim 7, wherein the frequency of alternation of said stabilization voltage is twice said fundamental frequency.

9. A method as claimed in claim 7, wherein in respect of each member of said first set of electrodes each unipolar strobe pulse applied to that member has a polarity that is the opposite of the polarity of the immediately preceding unipolar strobe pulse applied to that member.

10. A method as claimed in claim 9, wherein said charge-balanced bipolar data pulses are square-wave bipolar pulses.

11. A method as claimed in claim 9, wherein said stabilization voltage is a square-wave voltage.

12. A method as claimed in claim 11, wherein said charge balanced bipolar data pulses are square-wave pulses.

13. A method of operating a co-ordinate addressed liquid crystal cell with a ferroelectric liquid crystal layer exhibiting negative dielectric anisotropy, which cell has a set of pixels that are defined by the areas of overlap between the members of a first set of electrodes on one side of the liquid crystal layer and the members of a second set of electrodes on the other side of the layer, which pixels are selectively switchable between a first range of states and a second range of states, each said range extending from a fully switched state to a relaxed state, wherein said selective switching is effected by addressing the pixels on a line-by-line basis by applying unipolar strobe pulses serially to members of the first set of electrodes while charge-balanced bipolar strobe pulses are applied in parallel to members of the second set of electrodes, which method of operating includes sensing the temperature of the liquid crystal layer to derive a signal representative of its temperature, employing the sensed temperature signal to control the amplitudes of the strobe and data pulses, and additionally employing the sensed temperature signal to apply, only when the sensed temperature exceeds a predetermined value, to each of the pixels between each of its consecutive addressings with strobe and data pulses, a stabilization voltage that is an alternating voltage whose frequency of alternation is higher than the fundamental frequency defined by the waveform of a single one of said bipolar data pulses.

14. A method as claimed in claim 13, wherein in respect of each member of said first set of electrodes each unipolar strobe pulse applied to that member has a polarity that is the opposite of the polarity of the immediately preceding unipolar strobe pulse applied to that member.

15. A method as claimed in claim 14, wherein the frequency of alternation of said stabilization voltage is twice said fundamental frequency.

16. A method as claimed in claim 13, wherein said stabilization voltage is applied to each member of said first set of electrodes only between consecutive addressings of that member with strobe pulses.

17. A method as claimed in claim 13, wherein the frequency of alternation of said stabilization voltage is an even multiple of said fundamental frequency.

18. A liquid crystal device including a liquid crystal cell with a ferroelectric liquid crystal layer exhibiting negative dielectric anisotropy, which cell has a set of pixels that are defined by the areas of overlap between the members of a first set of electrodes on one side of the liquid crystal layer and the members of a second set of electrodes on the other side of the layer, which device includes strobe pulse, data pulse and stabilization waveform generation means, timing means, a temperature sensor, and a voltage amplitude controller, wherein the timing means is adapted to control the operation of the strobe pulse to address the pixels with binary data on a line-by-line basis by the application of unipolar strobe pulses serially to members of the first set of electrodes while charge-balanced bipolar data pulses, each having a positive-going portion and a negative-going portion, are applied in parallel to members of the second set of electrodes, which pipolar data pulses exist in two alternative forms in order to represent the binary data, in one of which forms the positive-going portion of the data pulse is synchronised with a unipolar strobe pulse, and in the other of which forms of data pulse the negative-going portion is synchronized with a unipolar strobe pulse, wherein the temperature sensor is adapted to sense the temperature of the cell and provide an input to the voltage amplitude controller, wherein the voltage amplitude controller is adapted to control the voltage amplitudes of the strobe and data pulses and of the stabilization waveform, which stabilization is an alternating voltage whose frequency of alternation is higher than the fundamental frequency that is defined by the waveform of a single one of the bipolar data pulses, and is applied to each of the pixels in the intervals between each of its consecutive addressings, and wherein the voltage amplitude controller is adapted to reduce to zero the voltage amplitude of the stabilization waveform whenever the sensed temperature is lower than a predetermined threshold value.

19. A liquid crystal device as claimed in claim 18, wherein the strobe pulse, data pulse and stabilization waveform generation means is adapted to generate a stabilization waveform whose frequency of alternation is an even multiple of said fundamental frequency.

20. A liquid crystal device as claimed in claim 19, wherein the strobe pulse, data and stabilization waveform generation means is adapted to generate a stabilization waveform whose frequency of alternation is twice said fundamental frequency.

21. A liquid crystal device as claimed in claim 18, wherein the strobe pulse, data pulse and stabilization waveform generation means is adapted to apply said stabilization waveform to each member of said first set of electrodes only between consecutive addressings of that member with strobe pulses.

* * * * *